US012792973B1

(12) United States Patent
Shen et al.

(10) Patent No.: US 12,792,973 B1
(45) Date of Patent: Nov. 10, 2026

(54) AUTOMATIC DETERMINATION OF HYPERPARAMETER OPTIMIZATION TERMINATION

(71) Applicant: Amazon Technologies, Inc., Seattle, WA (US)

(72) Inventors: Huibin Shen, Berlin (DE); Valerio Perrone, Berlin (DE); Aaron Klein, Berlin (DE); Jean Baptiste Faddoul, Berlin (DE); Matthias Seeger, Berlin (DE); Cedric Archambeau, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 1177 days.

(21) Appl. No.: 17/847,046

(22) Filed: Jun. 22, 2022

(51) Int. Cl.
*G06N 20/20* (2019.01)

(52) U.S. Cl.
CPC .................................... *G06N 20/20* (2019.01)

(58) Field of Classification Search
None
See application file for complete search history.

(56) References Cited

U.S. PATENT DOCUMENTS

2022/0128972 A1* 4/2022 Pyzer-Knapp ..... G05B 19/4155

OTHER PUBLICATIONS

"Overfitting in Bayesian Optimization: an empirical study and early-stopping solution", Makarova et al., 2021.*
"Excursion Search for Constrained Bayesian Optimization under a Limited Budget of Failures", Marco et al., 2020.*
Bayle et al., "Cross-validation Confidence Intervals for Test Error", 34th Conference on Neural Information Processing Systems (NeurIPS 2020), 12 pages.
Bergstra et al., "Algorithms for Hyper-Parameter Optimization", 25th Conference on Neural Information Processing Systems (NeurIPS 2011), 9 pages.
Bergstra et al., "Random Search for Hyper-Parameter Optimization", Journal of Machine Learning Research, 2012, 13: pp. 281-305.
Chen et al., "Bayesian Optimization in AlphaGo", arXiv preprint, Dec. 17, 2018, 15 pages.
Dong et al., "NAS-Bench-201: Extending the Scope of Reproducible Neural Architecture Search", International Conference on Learning Representations (ICLR 2020), 15 pages.
Eriksson et al., "Scalable Global Optimization via Local Bayesian Optimization", 33rd Conference on Neural Information Processing Systems (NeurIPS 2019), 11 pages.
Geisser, "The Predictive Sample Reuse Method with Applications", Journal of the American Statistical Association, 1975, 70(350):320-328.

(Continued)

*Primary Examiner* — Haimei Jiang
(74) *Attorney, Agent, or Firm* — Nicholson Devos Webster & Elliott LLP

(57) ABSTRACT

Techniques for hyperparameter optimization are described. In particular, examples detailed herein describe stopping hyperparameter optimization based at least in part on a comparison of a threshold value to a simple regret value. In some examples, the threshold value is provided by a request to perform hyperparameter optimization. In some examples, the threshold value is calculated during hyperparameter optimization.

20 Claims, 9 Drawing Sheets

(56) References Cited

OTHER PUBLICATIONS

Ha et al., "Bayesian Optimization with Unknown Search Space", 33rd Conference on Neural Information Processing Systems (NeurIPS 2019), pp. 11795-11804.
Hennig and Schuler, "Entropy Search for Information-Efficient Global Optimization", Journal of Machine Learning Research, 2012, 13:1809-1837.
Kirschner et al., "Distributionally Robust Bayesian Optimization", International Conference on Artificial Intelligence and Statistics (AISTATS 2020), 12 pages.
Klein et al., "Tabular Benchmarks for Joint Architecture and Hyperparameter Optimization", arXiv:1905.04970, 2019, 10 pages.
Kushner, "A New Method of Locating the Maximum Point of an Arbitrary Multipeak Curve in the Presence of Noise", Joint Automatic Control Conference, 1963, pp. 159-167.
Lorenz et al., "Stopping Criteria for Boosting Automatic Experimental Design Using Real-Time fMRI with Bayesian Optimization", arXiv:1511.07827, 2016, 14 pages.
Makarova et al., "Risk-Averse Heteroscedastic Bayesian Optimization", arXiv preprint, 2021, 15 pages.
McLeod et al., "Optimization, Fast and Slow: Optimally Switching Between Local and Bayesian Optimization", International Conference on Machine Learning (ICML 2018), 10 pages.
Melis et al., "On the State of the Art of Evaluation in Neural Language Models", International Conference on Learning Representations (ICLR 2018), 12 pages.
Mockus, "On Bayesian Methods for Seeking the Extremum", Optimization Techniques, Springer, 1975, pp. 400-404.
Nadeau and Bengio, "Inference for the Generalization Error", 16th Conference on Neural Information Processing Systems (NeurIPS 1999), 7 pages.
Nguyen et al., "Regret for Expected Improvement over the Best-Observed Value and Stopping Condition", Asian Conference on Machine Learning (ACML 2017), 10 pages.
Perrone et al., "Fair Bayesian Optimization", ACM Conference on AI, Ethics, and Society (AIES 18, Jun. 2021), 10 pages.
Rasmussen and Williams, "Gaussian Processes for Machine Learning", MIT Press, 2006, 248 pages.
Snoek et al., "Practical Bayesian Optimization of Machine Learning Algorithms", 25th Conference on Neural Information Processing Systems (NeurIPS 2012), 9 pages.
Srinivas et al., "Gaussian Process Optimization in the Bandit Setting: No Regret and Experimental Design", International Conference on Machine Learning (ICML 09, Jun. 2010), 9 pages.
Stone, "Cross-Validatory Choice and Assessment of Statistical Predictions", Journal of the Royal Statistical Society Series B, 1974, 36(2):111-147.
Tiao et al., "BORE: Bayesian Optimization by Density-Ratio Estimation", International Conference on Machine Learning (ICML 2021), 10 pages.

* cited by examiner

```
tuning_job_config = {
  "ParameterRanges": {
    "CategoricalParameterRanges": [],
    "ContinuousParameterRanges": [
      {
        "MaxValue": "1",
        "MinValue": "0",
        "Name": "eta"                          601
      },
      {
        "MaxValue": "2",
        "MinValue": "0",
        "Name": "alpha"
      },
      {
        "MaxValue": "10",
        "MinValue": "1",
        "Name": "min_child_weight"
      }
    ],
    "IntegerParameterRanges": [
      {
        "MaxValue": "NULL",
        "MinValue": "NULL",
        "Name": "max_depth"                    603
      }
    ]
  },
  "ResourceLimits": {
    "MaxNumberOfTrainingJobs": 20,             604
    "MaxParallelTrainingJobs": 3
  },
  "Strategy": "Bayesian",
  "HyperParameterTuningJobObjective": {
    "MetricName": "validation:auc",
    "Type": "Maximize",
   "AutoTerminate" : "YES/NO",                 606
   "Threshold" : "Value"
  }
}
```

*FIG. 6*

AUTOMATIC DETERMINATION OF HYPERPARAMETER OPTIMIZATION TERMINATION

BACKGROUND

The performance of machine learning algorithms crucially depends on their hyperparameters, setting them correctly is typically a tedious and expensive task. Hyperparameter optimization (HPO) emerged as a sub-field in machine learning that tries to automatically determine how to configure a machine learning algorithm. One of the most successful strategies for HPO is Bayesian optimization (BO) which iteratively trains the evaluations of the tuned algorithm. to select the most promising next candidate point that trades-off exploration and exploitation.

BRIEF DESCRIPTION OF DRAWINGS

Various embodiments in accordance with the present disclosure will be described with reference to the drawings, in which:

FIG. 6 illustrates examples of a tuning job configuration that includes a request for HPO.

DETAILED DESCRIPTION

Figure 1:
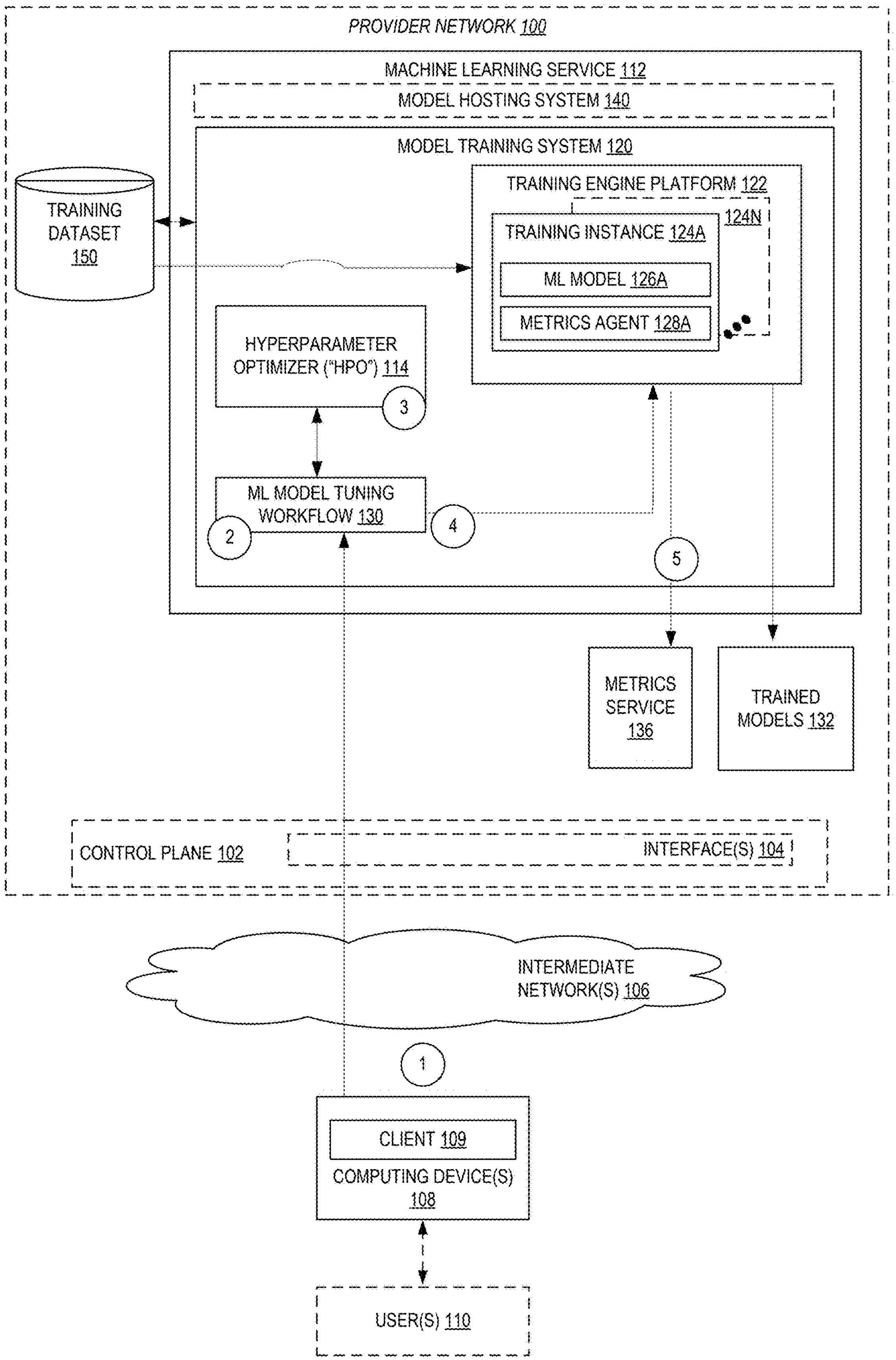
FIG. 1 is a diagram illustrating an environment for performing HPO using an automatic termination approach and/or ML model tuning according to some examples.

The present disclosure relates to methods, apparatus, systems, and non-transitory computer-readable storage media for automatically determining a termination point for hyperparameter optimization.

In practice, the quality of the final solution found by BO heavily depends on a user defined budget, such as wall-clock time or the number of iterations, which needs to be defined in advanced. If this budget is too small, BO might return hyperparameters that result in a poor predictive performance. If the budget is too large, compute resources will be wasted and, in some cases, it may result in overfitting. Automatically stopping BO is a rather under-explored topi. A simple baseline is to stop if BO has not found a better solution than the current best incumbent for some successive iterations, which is in the same vein as early stopping for neural network training. Another approach is to track probability of improvement or expected improvement, and stop the optimization process once it falls below a given threshold. However, determining this threshold may in practice be less intuitive than setting the number of iterations or the wall-clock time. Instead of stopping BO completely, some approaches propose to switch to local optimization when the global regret is smaller than a pre-defined target. This condition can also be used to terminate BO early, but it comes with additional complexity such as identifying a (convex) region for local optimization and again a pre-defined budget.

Detailed herein are approaches for an automatic termination criterion of BO or other HPO techniques. In particular, a high-probability confidence bound on the regret (i.e., the difference of our current solution to the global optimum) is built by exploiting a probabilistic model of the objective. As such, in some examples, users are asked to specify a desired tolerance (threshold) that defines how accurate should the final solution be compared to global optimum. In some examples, the threshold is determined via a cross-validation estimate of the generalization error. This takes into account the irreducible discrepancy between the actual objective and the target function optimized via BO, namely the difference between the performance on new data (i.e., the population risk) and the validation error.

Bayesian optimization (BO) refers to methods of optimizing a black-box objective $f:\Gamma\rightarrow\mathbb{R}$ in an iterative manner. At every step t, a learner selects an input $\gamma_t \in \Gamma$ and observes a noisy output $y \triangleq f(\gamma_t)+\varepsilon_t$, where $\varepsilon_t$ is typically assumed to be i.i.d. (sub)-Gaussian noise with some variance (proxy)

$$\sigma_\varepsilon^2.$$

The decision of the next input to evaluate depends on a probabilistic model, used to approximate the objective $f$, and an acquisition function, which determines the decision rule. A popular choice for the probabilistic model is a Gaussian process (GP): $f\sim GP(\mu,\kappa)$, specified by some mean function $\mu:\Gamma\rightarrow\mathbb{R}$ and some kernel $\kappa: \Gamma\times\Gamma\rightarrow\mathbb{R}$. As observations $y_{1:t}=[y_1, \ldots, y_t]^T$ for the selected inputs $G_t=\{\gamma_1, \ldots, \gamma_t\}$ are being collected, they are used to update the posterior belief of the model defined by the posterior mean $\mu_t(\gamma)$ and variance $$\sigma_t^2(\gamma)$$

as:

$$\mu_t(\gamma) = \kappa_t(\gamma)^T\left(K_t + \sigma_\varepsilon^2 1\right)^{-1} y_{1:t} \tag{1}$$

$$\sigma_t^2(\gamma) = \kappa(\gamma, \gamma) - \kappa_t(\gamma)^T\left(K_t + \sigma_\varepsilon^2 1\right)^{-1} \kappa_t(\gamma) \tag{2}$$

where $(K_t)_{i,j}=\kappa(\gamma_i,\gamma_j)$ and $\gamma_t(\gamma)^T=[\kappa(\gamma_1,\gamma), \ldots, \kappa(\gamma_t,\gamma)]^T$. The next input to query is determined by an acquisition function that aims to trade off exploration and exploitation. Common choices include probability of improvement, entropy search, GP upper-confidence bound, to name a few.

The convergence of BO can be quantified via (simple) regret, i.e., the sub-optimality in function value:

$$r_t := f(\gamma_t^*) - f(\gamma^*), \tag{3}$$

where $\gamma^*$ is the global optimizer of $f$ and $$\gamma_t^* = \arg\min_{\gamma \in G_t} f(\gamma).$$

Specifying adequate tolerance that defines how small the regret should be to terminate BO is of high importance as it determines both the quality and the cost of the solution. However, this criterion cannot be directly evaluated in practice, as the input $\gamma^*$ and the optimum $f(\gamma^*)$ are not known.

Hyperparameter optimization (HPO) is a widely considered application for BO. Consider a supervised learning setting training a machine learning model (e.g., a neural network) M on some feature-response data points $$D = \{(x_i, y_i)\}_{i=1}^n$$

sampled i.i.d. from some unknown data distribution P. The model is obtained by running a training algorithm (e.g., optimizing the weights of the neural network via SGD) on D, and the model returned also depends on hyperparameters $\gamma$ (e.g., learning rates used, batch size, etc.). We use the notation $M_\gamma(x; D)$ to refer to the prediction that the model produced by M makes for an input x, when trained with hyperparameters $\gamma$ on data D. Given some loss function $\ell(\bullet,\bullet)$, the population risk of the model on unseen data points is given by the expected loss $\mathbb{E}_P[l(y, M_\gamma(x, D))]$. The main objective of HPO is to identify hyperparameters $\gamma$, such that the resulting model minimizes the population risk:

$$f(\gamma) = \mathbb{E}_P[\ell(y, M_\gamma(x, D))],\ \gamma^* = \arg\min_{\gamma \in \Gamma} f(\gamma) \tag{4}$$

In practice, however, the population risk cannot be evaluated since P is unknown. Thus, typically, it is estimated on a separate finite validation set $D_V$ drawn from the same distribution P. As the result, practical HPO focuses on minimizing the empirical estimate $\hat{f}(\gamma)$ of the expected loss $f(\gamma)$ leading to (probably different) optimizer $$\gamma_D^*:$$

$$\hat{f}(\gamma) = \frac{1}{|D_V|} \sum_{x_1, y_1 \in D_V} \ell(y_i, M_\gamma(x_i, D)),\ \ \gamma_D^* = \arg\min_{\gamma \in \Gamma} \hat{f}(\gamma) \tag{5}$$

At its core, BO-based HPO evaluates noisy empirical estimate $\hat{f}(\gamma_t)$ for promising hyperparameters $\gamma_t$ for some finite number of iterations and the final performance after termination heavily depends on that number. Alternatively, one can also terminate BO when sufficiently close to the global optima, i.e., using an analogue to the simple regret $r_t$ for the validation loss $$\hat{f}(\gamma_t) \text{ and } \hat{f}(\gamma_t^*) = \min_{\gamma \in G_t} \hat{f}(\gamma):$$

$$\hat{r}_t := \hat{f}(\gamma_t^*) - \hat{f}(\gamma_D^*). \tag{6}$$

Importantly, the true HPO objective $f(\gamma)$ in Equation (4) and the empirical surrogate $\hat{f}(\gamma)$ in Equation (5) used for tuning by BO generally do not coincide. Therefore, existing BO approaches may yield sub-optimal solutions to the population risk minimization, even if they succeed in globally optimizing $\hat{f}(\gamma)$. This issue, however, is typically neglected in practical HPO.

Detailed herein are examples of a BO termination criterion that relies on estimates of both quantities. Confidence bounds are used to obtain high probability upper bounds on the simple regret. The statistical error is estimated in the case of cross-validation where the model performance is defined as an average over several training-validation runs. When cross-validation is not used, an intuitive threshold is defined in advance due to the usage of interpretable an upper bound of simple regret.

FIG. 1 is a diagram illustrating an environment for performing HPO using an automatic termination approach and/or ML model tuning according to some examples. FIG. 1 includes a model training system 120 that may be implemented as part of a machine learning service 112 provided by a provider network 100. The model training system 120 may be implemented using software, hardware, or a combination of both.

A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s) 104, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 104 can be part of, or serve as a front-end to, a control plane of the provider network 100 that includes "backend" services supporting and enabling the services that can be more directly offered to customers.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

For example, in various embodiments, a "serverless" function can include code provided by a user or other entity—such as the provider network itself—that can be executed on demand. Serverless functions can be maintained within a provider network by an on-demand code execution service, and can be associated with a particular user or account, or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources can be maintained in a "ready" state (e.g., having a pre-initialized runtime environment configured to execute the serverless functions), allowing the serverless functions to be executed in near real-time.

As shown in FIG. 1, the model training system 120 trains ML models. For example, the model training system 120 may be a component of a machine learning service 112 that receives requests to train models and utilizes the model training system 120 to instrument this training. Moreover, the model training system 120 may be utilized to perform ML model tuning jobs (also referred to as model parameter tuning jobs), running different ML training jobs with many different combinations of hyperparameters to seek which set produces a "best" resultant model. When each training is completed an accuracy score for each resultant model can be analyzed to detect which training run resulted in the highest accuracy model, which can then be recommended for use to a client, hosted and run via a model hosting system 140, stored in a storage location of a storage service for later use, etc. Thus, the model training system 120 may select different sets of hyperparameters and run different trainings via a training engine platform 122 and then choose the hyperparameter values that result in a model that performs the best, as measured by a chosen metric.

For example, suppose that one wants to solve a binary classification problem on a marketing dataset with the goal to maximize the area under the curve (auc) metric of the algorithm by training an XGBoost algorithm model. However, which values of the eta, alpha, min_child_weight, and max_depth hyperparameters to use to train the best model are not known. Embodiments herein may be utilized to find HP values for the ML model tuning workflow 130 to use to find the combination of values that results in a plurality training jobs that perform the best as measured by the objective metric that was chosen. Note that the ML model tuning workflow 130 may be used with built-in algorithms, custom algorithms, and/or pre-built containers for machine learning frameworks.

When choosing the best hyperparameters for the next training job, the ML model tuning workflow 130 considers everything that it knows about this problem so far. Sometimes it chooses a combination of hyperparameter values close to the combination that resulted in the best previous training job to incrementally improve performance. This allows hyperparameter tuning to exploit the best-known results. Other times, it chooses a set of hyperparameter values far removed from those it has tried. This allows it to explore the optimal HP values of hyperparameter values to try to find new areas that are not well understood.

For example, a user 110 may utilize or configure an application (e.g., client 109, such as a web browser executing a web application, a standalone application) executed by a computing device 108 to send one or more requests, at circle (1), to a machine learning service 112 to configure and execute a model tuning job. The one or more requests may be sent responsive to the user 110 having utilized a graphical user interface (GUI), console, or the like to configure an ML model tuning job by specifying, for example, a particular type of ML algorithm to be used, what training data to use, and the like. As a result, a request may include a NULL value (e.g., a value of a hyperparameter field in a tuning job configuration data structure) that indicates to the machine learning service 112 that it is to look for maximum and minimum optimal HP values to be used in training.

In some embodiments, the request includes several parameters including one or more of: the ML algorithm to train, an indication of cross-validation usage, a threshold, an objective metric to use, hyperparameter ranges (or a NULL value when these are to be determined), resource limits, and a strategy of how the ML model tuning workflow 130 is to choose the combinations of hyperparameter values to use for the training job it launches, etc. Examples of strategies include, but are not limited to: Bayesian and random. For a random search, the ML model tuning workflow 130 chooses a random combination of values from within the ranges specified for hyperparameters for each training job it launches. Bayesian search treats hyperparameter tuning like a regression problem. Given a set of input features (the hyperparameters), hyperparameter tuning optimizes a model for the chosen metric. To solve a regression problem, hyperparameter tuning makes guesses about which hyperparameter combinations are likely to get the best results and runs training jobs to test these values. After testing the first set of hyperparameter values, hyperparameter tuning uses regression to choose the next set of hyperparameter values to test.

Responsive to the one or more requests, the machine learning service 112 may cause a ML model tuning workflow 130 of the model training system 120 at circle (2) to begin executing the tuning job. For example, the model training system 120 may instruct a hyperparameter optimizer 114 ("HPO") component, which may be implemented using software executed by one or multiple computing devices, to begin and orchestrate the tuning job and determine which hyperparameters to adjust using a recommendation engine.

The HPO 114 may randomly select hyperparameter values (optionally subject to constraints specified by the request, such as a range of values to search within/between for particular hyperparameters during hyper), adjusting certain hyperparameters in various ways (e.g., increasing or decreasing one or more hyperparameter values by some amount, or drawing samples uniformly at random) to attempt to determine how certain changes result in different results, etc. at circle (3). HPO is automatically terminated based on a threshold by the HPO 114.

The training engine platform 122 may then utilize commands (e.g., issue various API calls to components or services) to run the one or more training jobs using one or more training instances 124A-124N at circle (4). For example, the training engine platform 122 may be caused to run one or more training instances 124A-124N, each working to train a ML model 126A by utilizing training data with a ML algorithm according to the set of hyperparameters for the particular training job.

During each training job, each training instance 124A may implement a metrics agent 128A that generates and emits metrics including an objective metric value pertaining to the status of the training job at circle (5). An objective metric value may be, for example, a metric that reveals a quality of the current model or of the training—e.g., a prediction accuracy, a training error, etc. The metrics agent 128A may emit these metrics, for example, at the conclusion of each training step of the training job. The metrics may be emitted in a variety of ways, such as via sending messages including the metrics to one or more destinations (e.g., directly to the HPO 114, by writing metrics to a data stream (e.g., provided by a real-time data streaming service of the provider network 100) that can be provided to or read by other components (e.g., the HPO 114), sent to a metrics service 136 at circle (5) that can be accessed by or provided to other components, etc. For example, the metrics pertaining to a particular training step of a training run may be provided to the HPO 114, which at circle may optionally store some or all of these metrics in a metrics store provided by a metrics service 136 (e.g., for tracking the state of the training job and/or tuning job).

At circle (6), upon completion of training according to an objective metric value, the training engine platform 122 stores the trained model(s) 132. Examples of objective metric values include area under the curve, binary classification error rate, negative log-likelihood, mean absolute error, mean average precision, multiclass classification error rate, negative log-likelihood for multiclass classification, normalized discounted cumulative gain, root mean square error, etc.

Figure 2:
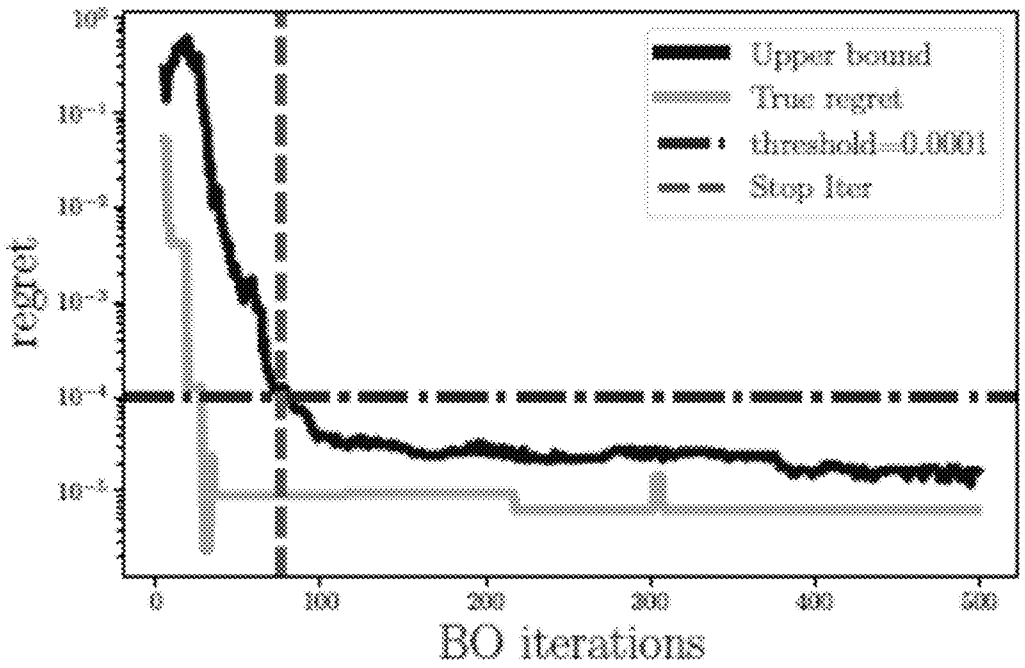
FIG. 2 illustrates examples of automated BO termination.

FIG. 2 illustrates examples of automated BO termination. As shown, the regret drops a lot during the first 50 or so iterations and then stabilizes. Unfortunately, the ground truth (regret) is an unknown. However, an upper bound can be estimated and once it is smaller than a threshold, the HPO stops. Depending upon the implementation, the threshold may be provided or calculated.

The true discrepancy of interest is analyzed between the population risk $$f(\gamma_t^*)$$

at some input $$\gamma_t^*$$

and true optimum $f(\gamma^*)$. The proposition provides the discrepancy bound in terms of the statistical error $E_{st}$ and simple regret $\hat{r}_t$. This naturally incites terminating HPO at a candidate $$\gamma_t^*$$

for which the simple regret $\hat{r}_t$ is of the same magnitude as the statistical error $E_{st}$ (as further reduction in $\hat{r}_t$ may not improve notably the true objective). However, neither of the quantities $E_{st}$ and $\hat{r}_t$ is known.

Below, a termination criterion that relies on estimates of both quantities is proposed. As long as the GP-based surrogate model of $\hat{f}(\bullet)$ is well-calibrated, it can be used to construct high-probability confidence bounds for $\hat{f}(\bullet)$. In particular, it has been shown that as long as $\hat{f}$ has bounded norm in the reproducing kernel Hilbert space (RKHS) associated with the covariance function $\kappa$ used in the GP, $\hat{f}(\gamma)$ is bounded (with high probability) by lower and upper confidence bounds $lcb_t(\gamma)=\mu_t(\gamma)-\sqrt{\beta_t}\sigma_t(\gamma)$ and $ucb_t(\gamma)=\mu_t(\gamma)+\sqrt{\beta_t}\sigma_t(\gamma)$. Hereby, $\beta_t$ is a parameter that ensures validity of the confidence bounds.

Consequently, the unknown $$\hat{f}(\gamma_t^*) \text{ and } \hat{f}(\gamma_D^*)$$

can be bound that define the sub-optimality $\hat{r}_t$:

$$\bar{r}_t = \hat{f}(\gamma_t^*) - \hat{f}(\gamma_D^*) \le \min_{\gamma\in G_t} ucb_t(\gamma) - \min_{\gamma\in\Gamma} lcb_t(\gamma) =: \bar{r}_t, \tag{7}$$

where the inequality for $$\hat{f}(\gamma_t^*)$$

is due to the definition of the reporting rule $$\hat{f}(\gamma_t^*) = \min_{\gamma\in G_t} \hat{f}(\gamma)$$

over the evaluated points $G_t=\{\gamma_1, \ldots, \gamma_t\}$.

The optimization error can be controlled via the (computable) regret upper bound $\bar{r}_t$ in the above and the BO can be stopped when $\bar{r}_t$ is smaller than some threshold $\epsilon_{BO}$, i.e., at an iteration T: $\bar{r}_t \le \epsilon_{BO}$. In some examples, $\epsilon_{BO}$ is set to be of similar magnitude as the statistical error $\epsilon_{st}$ (since smaller regret $\hat{r}_t$ is not beneficial when $\epsilon_{st}$ dominates).

Cross-validation is the standard approach to compute an estimator $\hat{f}(\gamma)$ of the population risk. The data D is partitioned into k equal-sized sets $D_1, \ldots, D_k$ used for (a) training the model $M_\gamma(\bullet; D_{-i})$, where $D_{-i}=\cup_{j\neq i} D_i$ (i.e., training on all but the i-th fold of the data. These two steps are then repeated in a loop k times, and then the average over k validation result is computed, yielding the noisy BO evaluation $y=\hat{f}(\gamma)+\varepsilon$ where the noise is due to the randomness in the training procedure or to epistemic uncertainty.

The statistical error $\epsilon_{st}$ of an estimate can be characterized in terms of its variance and bias where the latter can be neglected in case of cross-validation. For the sample variance (denoted as $$s_{cv}^2)$$

of k-fold cross-validation, a simple post-correction technique to estimate the variance Var $\hat{f}(\gamma)$ is $$\text{Var } \hat{f}(\gamma) \approx \left(\frac{1}{k} + \frac{|D_i|}{|D_{-i}|}\right) s_{cv}^2(\gamma), \tag{8}$$

where $|D_i|$, $|D_{-i}|$ are the set sizes. For example, in the case of 10-fold cross-validation we have $$\text{Var } \hat{f}(\gamma) \approx 0.21 s_{cv}^2(\gamma).$$

Let $y_t=\hat{f}(\gamma_t)+\varepsilon_t$ be a noisy evaluation at the input $\gamma_t$ and $$\gamma_t^* = \underset{\gamma\in\{\gamma_1, \ldots, \gamma_t\}}{\text{argmin}}\ y_i$$

denote the best observed input by BO iteration t. Let $\bar{r}_t$ defined in Equation (7) be the simple regret bound computed at each iteration t. Let the variance $$\text{Var } \hat{f}(\gamma_t^*)$$

of the estimator $\hat{f}(\bullet)$ be approximated according to Equation (8) where $\hat{f}(\bullet)$ is a cross-validation-based estimator being iteratively minimized by BO. Then, BO is terminated once:

$$\bar{r}_t < \sqrt{\text{Var } \hat{f}(\gamma_t^*)}.$$

Intuitively, the termination is triggered once the maximum plausible improvement becomes less than the standard deviation of the estimate. This variance-based termination condition adapts to different algorithms or datasets and its computation comes with negligible computational cost on top of cross-validation. When cross-validation cannot be used or is computationally prohibitive, a user can define the right-hand side of the termination condition. In this case, the upper bond on the left-hand side still has an intuitive interpretation: the user can set the threshold based on their desired solution accuracy.

Figure 3:
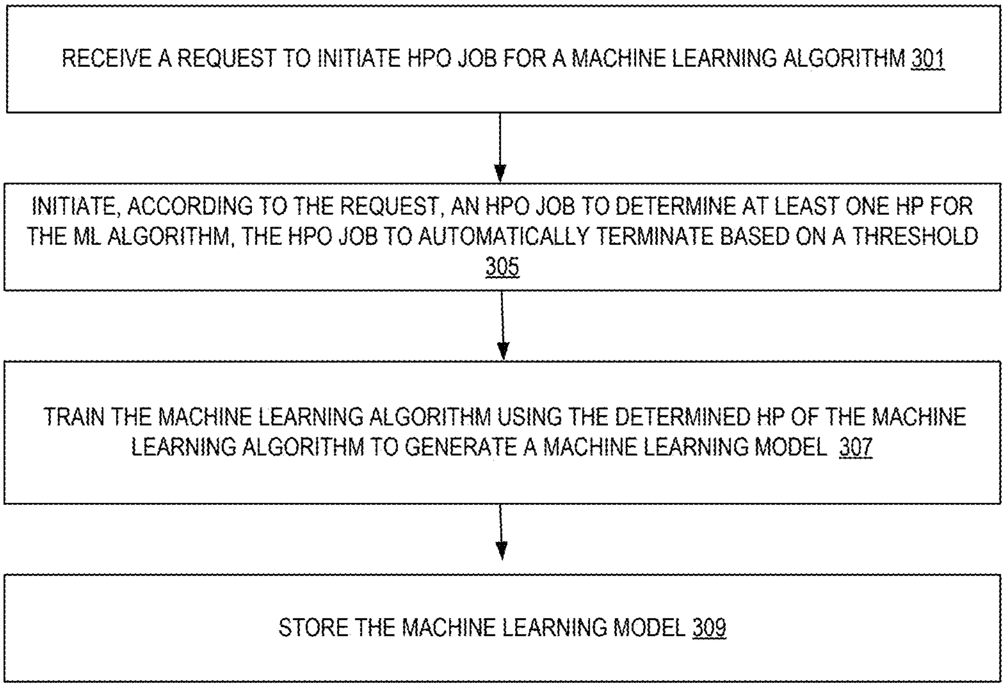
FIG. 3 is a flow diagram illustrating operations of a method using automatic HPO termination for tuning a ML algorithm according to some embodiments.

FIG. 3 is a flow diagram illustrating operations of a method using automatic HPO termination for tuning a ML algorithm according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory.

At 301, a request to initiate a HP tuning job for a machine learning algorithm is received. For example, a request as noted above is received by the ML tuning workflow 130. This request includes at least one indication of a HP to be automatically decided. The request includes, in some examples, a threshold to use in determining HPO termination. In other examples, the request does not include such a threshold and the threshold is determined automatically.

Figure 4:
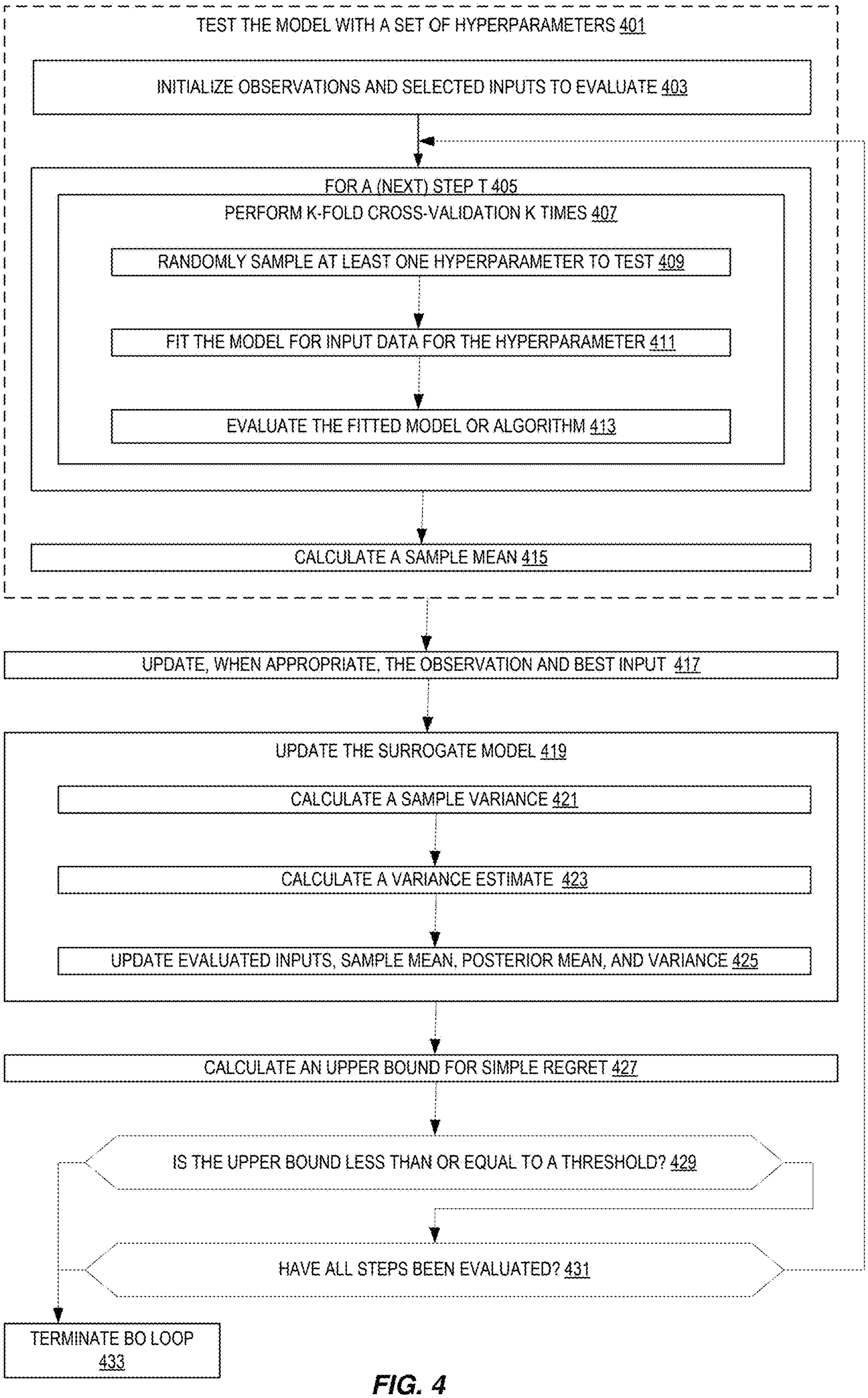
FIG. 4 is a flow diagram illustrating operations of a method automatic HPO BO termination for a ML algorithm or model according to some embodiments.

A HP tuning job is initiated to at least perform HPO of the machine learning algorithm using automatic termination at 305. FIG. 4 illustrates more detailed embodiments of this operation.

The machine learning algorithm is trained using the determined at least one optimal HP value for the at least one HP of the machine learning algorithm to generate a machine learning model at 307.

The machine learning model is stored at 309.

FIG. 4 is a flow diagram illustrating operations of a method automatic HPO BO termination for a ML algorithm or model according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory.

A set of observations and selected inputs (e.g., feature-response data points) to evaluate are initialized at 403. In some examples, for a given step (essentially a "best" hyperparameter value), at least one hyperparameter is sampled to test at 409 and cross-validation is performed k times at 407. In some examples, k is provided by the request to perform HPO. This cross-validation trains the ML model or algorithm on the k equally sized data sets and then validates the model k number of times. This loop is reflected in, fitting the input data for the selected at least one hyperparameter at 411 and evaluating the fitted model at 413. After the that loop is complete, the average over k validations results is computed (e.g., a sample mean) which provides a noisy BO evaluation at 415. In some examples, acts 403-415 are considered testing the probabilistic model at 401.

When appropriate, the observation and current best input (global optimizer) are updated at 417.

The surrogate model is updated at 419 by calculating a sample variance 421, calculating a variance estimate at 423, and updating evaluated inputs, the sample mean, a posterior mean, and the variance at 425.

An upper bound for simple regret is calculated at 427. A determination of if the upper bound is less than or equal to a threshold is made at 429. The threshold is calculated. When the upper bound is less than or to the threshold, then the BO loop is terminated and the current best global optimizer is returned as the hyperparameter value at 433. Otherwise, a determination of if all steps have been evaluated is made at 431. If not, then the cross validation is performed for the next step. If yes, then the current best global optimizer is returned as the hyperparameter value.

In some examples, the above is algorithmically defined as:

Algorithm BO for HPO with cross-validation and automatic termination

Figure 5:
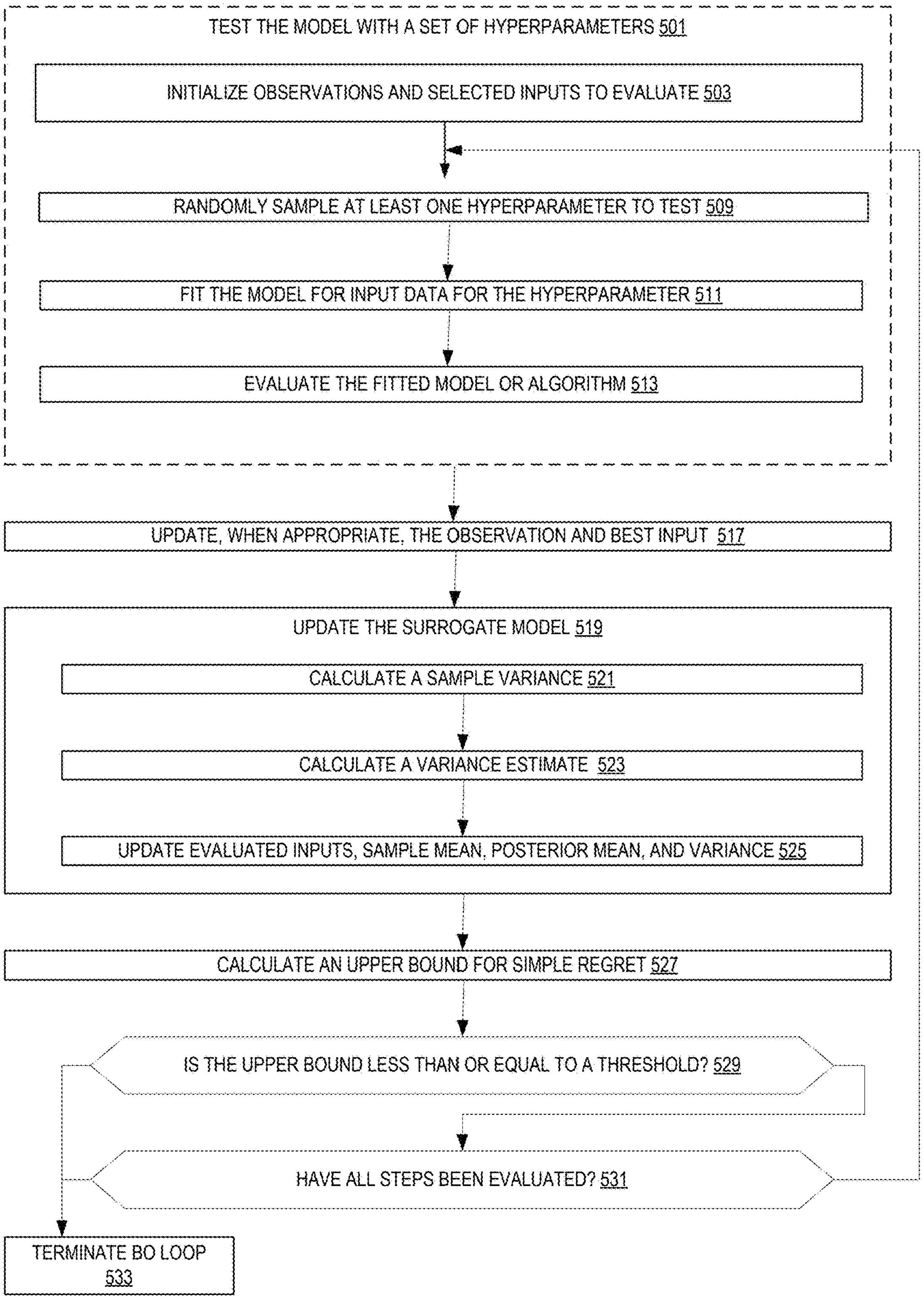
FIG. 5 is a flow diagram illustrating operations of a method automatic HPO BO termination for a ML algorithm or model according to some embodiments.

Require: Model $M_\gamma$ parametrized by $\gamma \in \Gamma$, data $D_1, \ldots, D_k$ for k-fold cross-validation, acquisition function $\alpha(\gamma)$ 1: Initialize $y_t^* = +\infty$ and $G_t = \{\ \}$
2: for t = 1, 2, ... do
3: Sample $\gamma_t \in \arg\max_{\gamma\in\Gamma}\alpha(\gamma)$
4: for i = 1, 2, . . . , k do
5: Fit the model $M_\gamma(\cdot; D_{-i})$, where $D_{-i} = \cup_{j\neq i} D_i$
6: Evaluate the fitted model $y_t^i = \frac{1}{|D_i|}\sum_{x_i, y_i \in D_i} \ell(y_i, M_\gamma(x_i, D_{-i}))$
7: end for
8: Calculate the sample mean $y_t = \frac{1}{k}\sum_k y_t^i$,
9: if $y_t \le y_t^*$ then
10: Update $y_t^* = y_t$ and the current best $\gamma_t^* = \gamma_t$
11: end if
12: Calculate the sample variance $s_{cv}^2 = \frac{1}{k}\sum_i (y_t - y_t^i)^2$
13: Calculate the variance estimate $\mathrm{Var}\hat{f}(\gamma_t^*) \approx \left(\frac{1}{k} + \frac{|D_i|}{|D_{-i}|}\right)s_{cv}^2$ from Eq. (8)
14: Update $G_t = G_{t-1} \cup \gamma_t$ and $\gamma_{1:t-1} = \gamma_{1:t-1} \cup \gamma_t$
15: Update $\sigma_t$, $\mu_t$ with Eqs. (1) and (2)
16: Calculate upper bound $\bar{r}_t := \min_{\gamma\in G_t} ucb_t(\gamma) - \min_{\gamma\in\Gamma} lcb_t(\gamma)$ for simple regret from Eq. (7)
17: if the condition $\bar{r}_t \le \sqrt{\mathrm{Var}\hat{f}(\gamma_t^*)}$ holds then
18: terminate BO loop
19: end if
20: end for
21: Output: $\gamma_t^*$ 13: Calculate the variance estimate FIG. 5 is a flow diagram illustrating operations of a method automatic HPO BO termination for a ML algorithm or model according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory.

A set of observations and selected inputs (e.g., feature-response data points) to evaluate are initialized at 503. In some examples, for a given step (essentially a "best" hyperparameter value), at least one hyperparameter is sampled to test at 509. The input data for the selected at least one hyperparameter is fitted at 511 and the fitted model evaluated at 513.

When appropriate, the observation and current best input (global optimizer) are updated at 517.

The surrogate model is updated at 519 by calculating a sample variance 521, calculating a variance estimate at 523, and updating evaluated inputs, the sample mean, a posterior mean, and the variance at 525.

An upper bound for simple regret is calculated at 527. A determination of if the upper bound is less than or equal to a threshold is made at 529. The threshold is provided. When the upper bound is less than or to the threshold, then the BO loop is terminated and the current best global optimizer is returned as the hyperparameter value at 533. Otherwise, a determination of if all steps have been evaluated is made at 531. If not, then another hyperparameter is selected to test. If yes, then the current best global optimizer is returned as the hyperparameter value.

In some examples, the above is algorithmically defined as:

Algorithm BO for HPO with cross-validation and automatic termination

Require: Model $M_\gamma$ parametrized by $\gamma \in \Gamma$, data $D_1, \ldots D_k$, acquisition function $\alpha(\gamma)$, and threshold value 1: Initialize $y_t^* = +\infty$ and $G_t = \{\ \}$
2: Sample $\gamma_t \in \arg\max_{\gamma\in\Gamma}\alpha(\gamma)$
3: Fit the model $M_\gamma(\cdot; D_{-i})$, where $D_{-i} = \cup_{j\neq i} D_i$
4: Evaluate the fitted model $y_t^i = \frac{1}{|D_i|}\sum_{x_i, y_i \in D_i} \ell(y_i, M_\gamma(x_i, D_{-i}))$
5: if $y_t \le y_t^*$ then
6: Update $y_t^* = y_t$ and the current best $\gamma_t^* = \gamma_t$
7: end if
8: Update $G_t = G_{t-1} \cup \gamma_t$ and $\gamma_{1:t-1} = \gamma_{1:t-1} \cup \gamma_t$
9: Update $\sigma_t$, $\mu_t$ with Eqs. (1) and (2)
10: Calculate upper bound $\bar{r}_t := \min_{\gamma\in G_t} ucb_t(\gamma) - \min_{\gamma\in\Gamma} lcb_t(\gamma)$ for simple regret from Eq. (7)
11: if the condition $\bar{r}_t \le$ threshold where threshold is provided
12: terminate BO loop
13: end if
14: end for
15: Output: $\gamma_t^*$ FIG. 6 illustrates examples of a tuning job configuration that includes a request for HPO. The configuration is received or referenced as a part of a tuning job request.

As a part of the configuration, the limits of the resource that the hyperparameter tuning job can consume are provided at 604.

Parameter ranges 601 and 603 are provided for continuous and integer parameters (e.g., eta, alpha, min_child_weight, and max_depth hyperparameters of the XGBoost Algorithm).

A strategy for HPO is defined (here Bayesian) and an objective metric for the hyperparameter tuning job is identified. This metric is used by hyperparameter tuning job to evaluate the training job that it launches. In some examples, the configuration includes HPO auto-termination aspects 505 such as an indication of if auto-termination is to be used and/or a threshold value.

Figure 7:
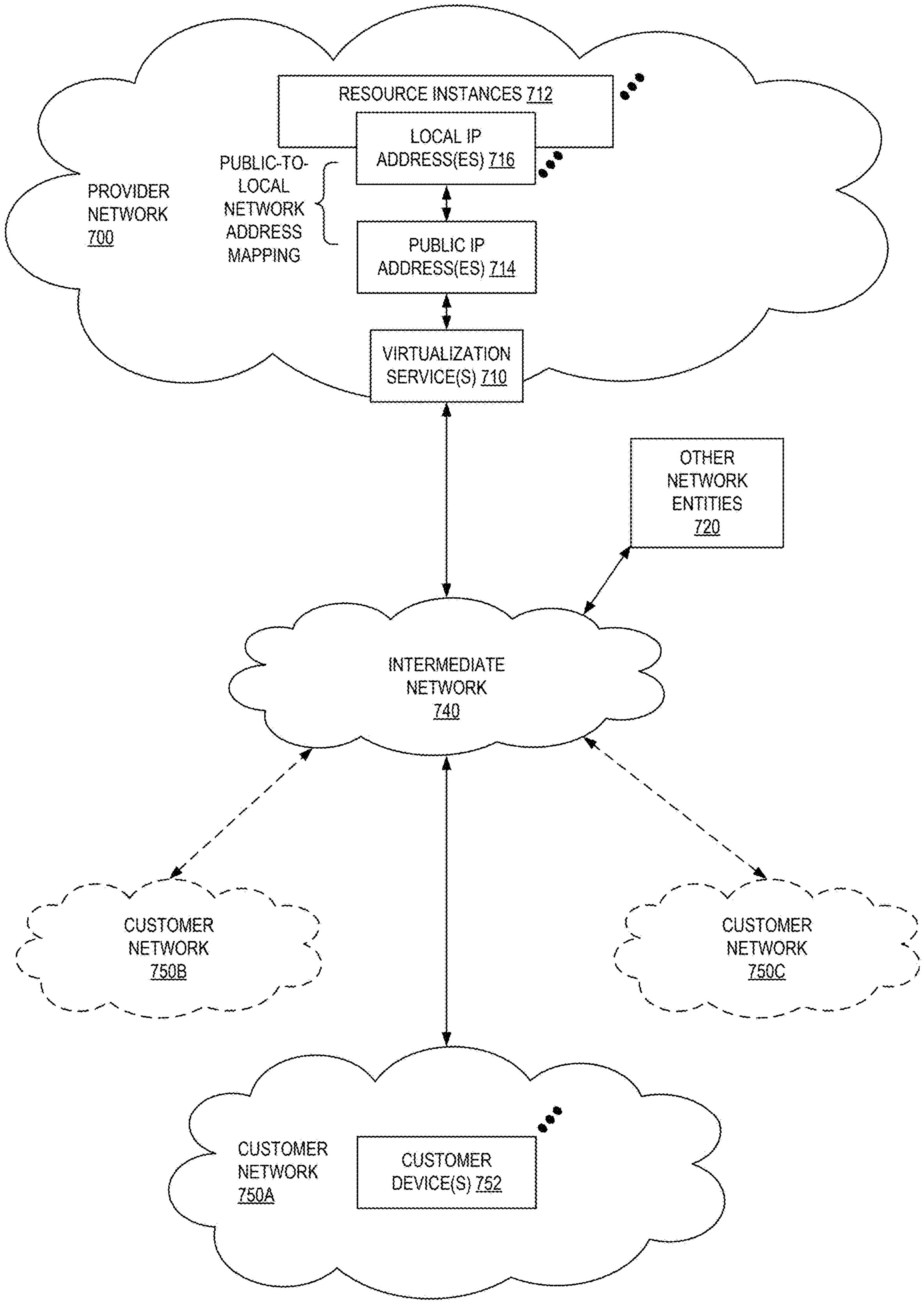
FIG. 7 illustrates an example provider network environment according to some embodiments.

FIG. 7 illustrates an example provider network (or "service provider system") environment according to some embodiments. A provider network 700 can provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 can be associated with the resource instances 712; the local IP addresses are the internal network addresses of the resource instances 712 on the provider network 700. In some embodiments, the provider network 700 can also provide public IP addresses 714 and/or public IP address ranges (e.g., Internet Protocol version 4 (IPv4) or Internet Protocol version 6 (IPv6) addresses) that customers can obtain from the provider 700.

Conventionally, the provider network 700, via the virtualization services 710, can allow a customer of the service provider (e.g., a customer that operates one or more customer networks 750A-750C (or "client networks") including one or more customer device(s) 752) to dynamically associate at least some public IP addresses 714 assigned or allocated to the customer with particular resource instances 712 assigned to the customer. The provider network 700 can also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of the customer network(s) 750A-750C can, for example, implement customer-specific applications and present the customer's applications on an intermediate network 740, such as the Internet. Other network entities 720 on the intermediate network 740 can then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 can be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 700; a customer can then assign their allocated public IP addresses to particular resource instances allocated to the customer. These public IP addresses can be referred to as customer public IP addresses, or simply customer IP addresses. Instead of being assigned by the provider network 700 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
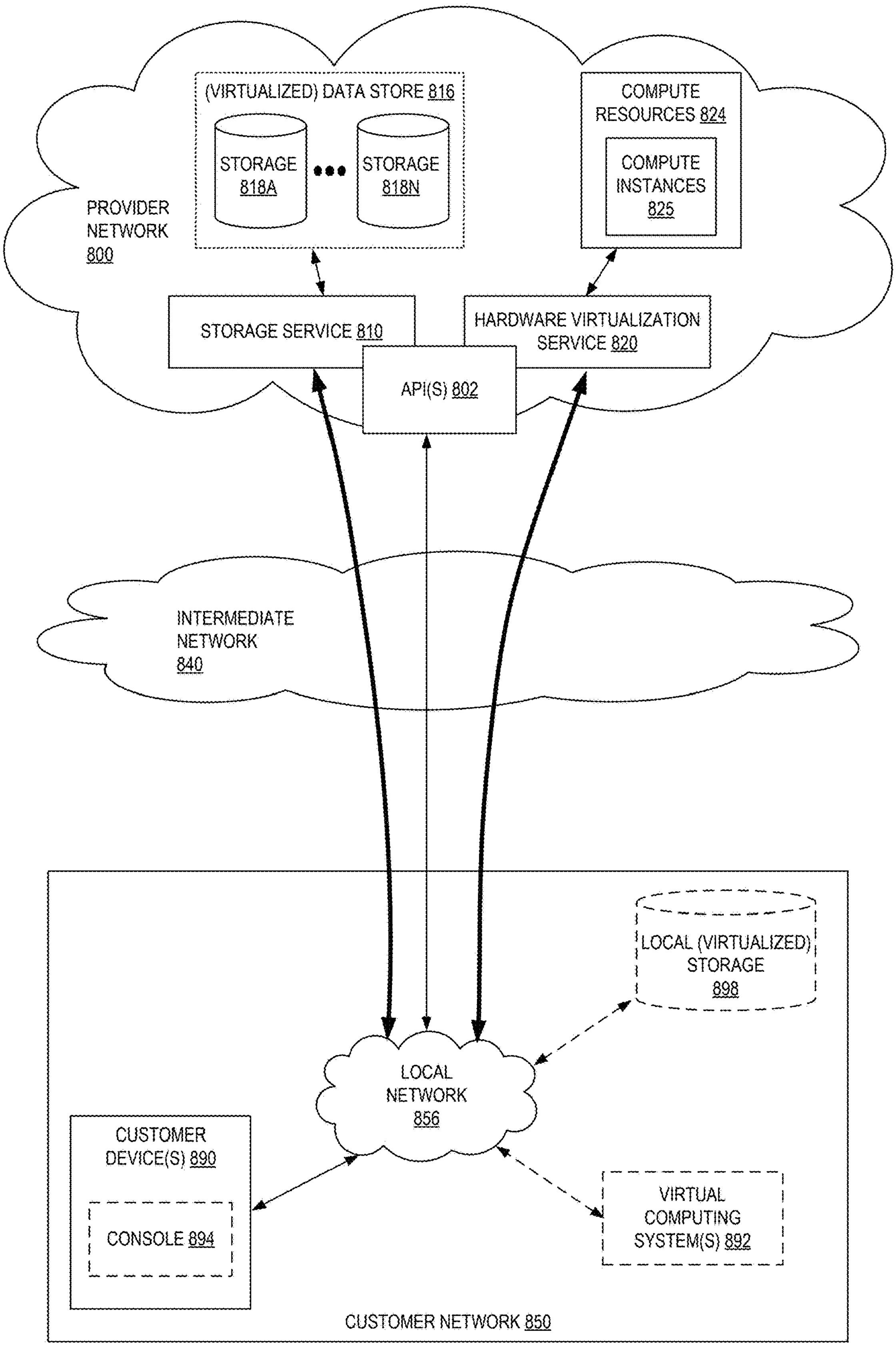
FIG. 8 is a block diagram of an example provider network that provides a storage service and a hardware virtualization service to customers according to some embodiments.

FIG. 8 is a block diagram of an example provider network environment that provides a storage service and a hardware virtualization service to customers, according to some embodiments. A hardware virtualization service 820 provides multiple compute resources 824 (e.g., compute instances 825, such as VMs) to customers. The compute resources 824 can, for example, be provided as a service to customers of a provider network 800 (e.g., to a customer that implements a customer network 850). Each computation resource 824 can be provided with one or more local IP addresses. The provider network 800 can be configured to route packets from the local IP addresses of the compute resources 824 to public Internet destinations, and from public Internet sources to the local IP addresses of the compute resources 824.

The provider network 800 can provide the customer network 850, for example coupled to an intermediate network 840 via a local network 856, the ability to implement virtual computing systems 892 via the hardware virtualization service 820 coupled to the intermediate network 840 and to the provider network 800. In some embodiments, the hardware virtualization service 820 can provide one or more APIs 802, for example a web services interface, via which the customer network 850 can access functionality provided by the hardware virtualization service 820, for example via a console 894 (e.g., a web-based application, standalone application, mobile application, etc.) of a customer device 890. In some embodiments, at the provider network 800, each virtual computing system 892 at the customer network 850 can correspond to a computation resource 824 that is leased, rented, or otherwise provided to the customer network 850.

From an instance of the virtual computing system(s) 892 and/or another customer device 890 (e.g., via console 894), the customer can access the functionality of a storage service 810, for example via the one or more APIs 802, to access data from and store data to storage resources 818A-818N of a virtual data store 816 (e.g., a folder or "bucket," a virtualized volume, a database, etc.) provided by the provider network 800. In some embodiments, a virtualized data store gateway (not shown) can be provided at the customer network 850 that can locally cache at least some data, for example frequently accessed or critical data, and that can communicate with the storage service 810 via one or more communications channels to upload new or modified data from a local cache so that the primary store of data (the virtualized data store 816) is maintained. In some embodiments, a user, via the virtual computing system 892 and/or another customer device 890, can mount and access virtual data store 816 volumes via the storage service 810 acting as a storage virtualization service, and these volumes can appear to the user as local (virtualized) storage 898.

While not shown in FIG. 8, the virtualization service(s) can also be accessed from resource instances within the provider network 800 via the API(s) 802. For example, a customer, appliance service provider, or other entity can access a virtualization service from within a respective virtual network on the provider network 800 via the API(s) 802 to request allocation of one or more resource instances within the virtual network or within another virtual network.

Illustrative Systems

Figure 9:
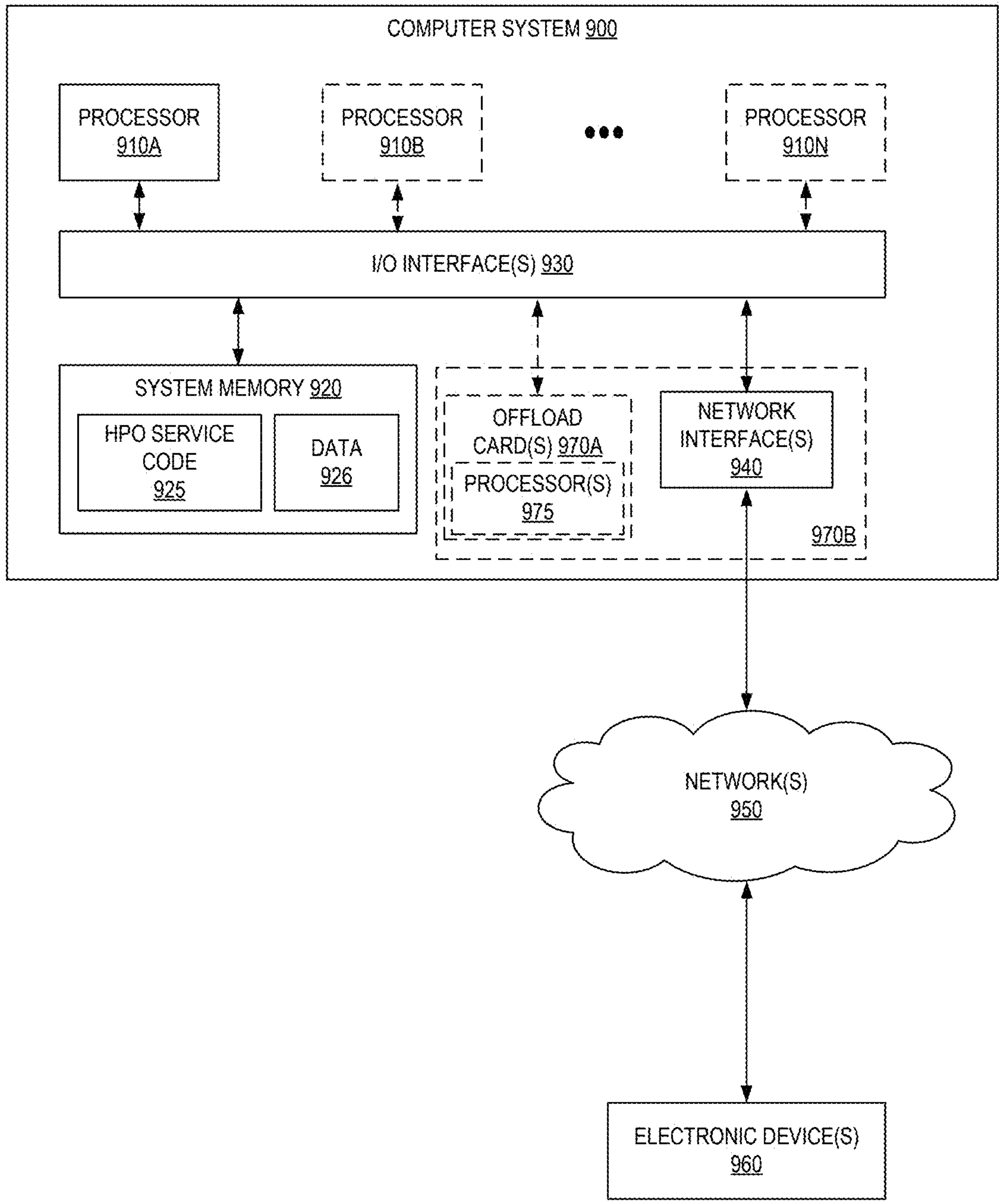
FIG. 9 is a block diagram illustrating an example computer system that can be used in some embodiments.

In some embodiments, a system that implements a portion or all of the techniques described herein can include a general-purpose computer system, such as the computer system 900 illustrated in FIG. 9, that includes, or is configured to access, one or more computer-accessible media. In the illustrated embodiment, the computer system 900 includes one or more processors 910 coupled to a system memory 920 via an input/output (I/O) interface 930. The computer system 900 further includes a network interface 940 coupled to the I/O interface 930. While FIG. 9 shows the computer system 900 as a single computing device, in various embodiments the computer system 900 can include one computing device or any number of computing devices configured to work together as a single computer system 900.

In various embodiments, the computer system 900 can be a uniprocessor system including one processor 910, or a multiprocessor system including several processors 910 (e.g., two, four, eight, or another suitable number). The processor(s) 910 can be any suitable processor(s) capable of executing instructions. For example, in various embodiments, the processor(s) 910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 910 can commonly, but not necessarily, implement the same ISA.

The system memory 920 can store instructions and data accessible by the processor(s) 910. In various embodiments, the system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 920 as HPO service code 925 (e.g., executable to implement, in whole or in part, the HPO optimizer service 114) and data 926.

In some embodiments, the I/O interface 930 can be configured to coordinate I/O traffic between the processor 910, the system memory 920, and any peripheral devices in the device, including the network interface 940 and/or other peripheral interfaces (not shown). In some embodiments, the I/O interface 930 can perform any necessary protocol, timing, or other data transformations to convert data signals from one component (e.g., the system memory 920) into a format suitable for use by another component (e.g., the processor 910). In some embodiments, the I/O interface 930 can include support for devices attached through various types of peripheral buses, such as a variant of the Peripheral Component Interconnect (PCI) bus standard or the Universal Serial Bus (USB) standard, for example. In some embodiments, the function of the I/O interface 930 can be split into two or more separate components, such as a north bridge and a south bridge, for example. Also, in some embodiments, some or all of the functionality of the I/O interface 930, such as an interface to the system memory 920, can be incorporated directly into the processor 910.

The network interface 940 can be configured to allow data to be exchanged between the computer system 900 and other devices 960 attached to a network or networks 950, such as other computer systems or devices as illustrated in FIG. 1, for example. In various embodiments, the network interface 940 can support communication via any suitable wired or wireless general data networks, such as types of Ethernet network, for example. Additionally, the network interface 940 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 900 includes one or more offload cards 970A or 970B (including one or more processors 975, and possibly including the one or more network interfaces 940) that are connected using the I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some embodiments the offload card(s) 970A or 970B can perform compute instance management operations, such as pausing and/or un-pausing compute instances, launching and/or terminating compute instances, performing memory transfer/copying operations, etc. These management operations can, in some embodiments, be performed by the offload card(s) 970A or 970B in coordination with a hypervisor (e.g., upon a request from a hypervisor) that is executed by the other processors 910A-910N of the computer system 900. However, in some embodiments the virtualization manager implemented by the offload card(s) 970A or 970B can accommodate requests from other entities (e.g., from compute instances themselves), and cannot coordinate with (or service) any separate hypervisor.

In some embodiments, the system memory 920 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 900 via the I/O interface 930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 900 as the system memory 920 or another type of memory. Further, a computer-accessible medium can include transmission media or signals such as electrical, electromagnetic, or digital signals, conveyed via a communication medium such as a network and/or a wireless link, such as can be implemented via the network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional aspects that add additional features to some embodiments. However, such notation should not be taken to mean that these are the only options or optional operations, and/or that blocks with solid borders are not optional in certain embodiments.

Reference numerals with suffix letters can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:

receiving, at a hyperparameter optimization (HPO) service implemented as HPO service code stored within memory and executed by one or more processors of the HPO service, a request to perform HPO to determine a value for at least one hyperparameter of a machine learning algorithm, the request including an indication that the HPO is to automatically terminate based at least in part on a threshold value compared to a simple regret value, wherein the request to perform HPO to determine the value for the at least one hyperparameter of the machine learning algorithm does not include the threshold value and the threshold value is determined by a cross-validation estimate of a generalization error;

determining, by the HPO service according to the request, a hyperparameter value for the at least one hyperparameter of the machine learning algorithm using HPO based on an evaluation of one or more hyperparameters from the machine learning algorithm on different datasets, wherein the evaluation is to stop when a computed upper bound for simple regret is smaller than the threshold; and tuning the machine learning algorithm using the hyperparameter value for the at least one hyperparameter of the machine learning algorithm to generate a machine learning model.

2. The computer-implemented method of claim 1, wherein the request to perform HPO for the at least one hyperparameter of a machine learning algorithm includes the threshold value.

3. The computer-implemented method of claim 1, wherein the request to perform HPO for at least one hyperparameter of a machine learning algorithm further comprises at least one of an indication of a container image that specifies a training algorithm, an input configuration for training and test data, a storage location for the output of the HPO, values of ML algorithm hyperparameters that are to not be optimized, and compute instance type to use for HPO.

4. A computer-implemented method comprising:

receiving, at a hyperparameter optimization (HPO) service implemented as HPO service code stored within memory and executed by one or more processors of the HPO service, a request to perform HPO to determine a value for at least one hyperparameter of a machine learning algorithm, the request including an indication that the HPO is to automatically terminate based at least in part on a threshold value compared to a simple regret value, wherein the request to perform HPO to determine the value for the at least one hyperparameter of the machine learning algorithm does not include the threshold value and the threshold value is determined by a cross-validation estimate of a generalization error;

determining, by the HPO service according to the request, a hyperparameter value for the at least one hyperparameter of the machine learning algorithm using HPO based on an evaluation of one or more hyperparameters from the machine learning algorithm on different datasets, wherein the evaluation is determined to stop when a probability of improvement of the hyperparameter value is less than or equal to the threshold value; and tuning the machine learning algorithm using the hyperparameter value for the at least one hyperparameter of the machine learning algorithm to generate a machine learning model.

5. The computer-implemented method of claim 4, wherein the simple regret is calculated based on a validation loss.

6. The computer-implemented method of claim 4, wherein the HPO utilizes Bayesian optimization.

7. The computer-implemented method of claim 4, wherein the HPO utilizes random search optimization.

8. The computer-implemented method of claim 4, wherein the request to perform HPO for at least one hyperparameter of a machine learning algorithm further comprises at least one of an indication of a container image that specifies a training algorithm, an input configuration for training and test data, a storage location for the output of the HPO, values of ML algorithm hyperparameters that are to not be optimized, and compute instance type to use for HPO.

9. The computer-implemented method of claim 8, wherein the request to perform HPO for at least one hyperparameter of a machine learning algorithm further comprises an indication of resource limits to apply during HPO.

10. The computer-implemented method of claim 4, wherein determining when the evaluation is to stop comprises determining when a computed upper bound for simple regret is smaller than or equal to the threshold.

11. The computer-implemented method of claim 4, wherein tuning the machine learning algorithm using the hyperparameter value for the at least one hyperparameter of the machine learning algorithm to generate a machine learning model comprises executing a plurality of training jobs using a training dataset to determine a machine learning model to store.

12. The computer-implemented method of claim 11, wherein the machine learning model to store is a model that performs best as measured by a defined objective metric.

13. A system comprising:

a first one or more electronic devices to implement a storage service in a multi-tenant provider network to store a trained machine learning model; and a second one or more electronic devices to implement a model training service in the multi-tenant provider network, the model training service including instructions that upon execution cause the model training service to:

receive, at a hyperparameter optimization (HPO) service implemented as HPO service code stored within memory and executed by one or more processors of the HPO service, a request to perform HPO to determine a value for at least one hyperparameter of a machine learning algorithm, the request including an indication that the HPO is to automatically terminate based at least in part on a threshold value compared to a simple regret value, wherein the request to perform HPO to determine the value for the at least one hyperparameter of the machine learning algorithm does not include the threshold value and the threshold value is determined by a cross-validation estimate of a generalization error;

determine, by the HPO service according to the request, a hyperparameter value for the at least one hyperparameter of the machine learning algorithm using HPO based on an evaluation of one or more hyperparameters from the machine learning algorithm on different datasets, wherein the evaluation is determined to stop when a probability of improvement of the hyperparameter value is less than or equal to the threshold value; and tune the machine learning algorithm using the hyperparameter value for the at least one hyperparameter of the machine learning algorithm to generate a machine learning model to store in the storage service.

14. The system of claim 13, wherein the HPO utilizes Bayesian optimization.

15. The system of claim 13, wherein the HPO utilizes random search optimization.

16. The system of claim 13, wherein the request to perform HPO for at least one hyperparameter of a machine learning algorithm further comprises at least one of an indication of a container image that specifies a training algorithm, an input configuration for training and test data, a storage location for the output of the HPO, values of ML algorithm hyperparameters that are to not be optimized, and compute instance type to use for HPO.

17. The system of claim 13, wherein determining when the evaluation is to stop comprises determining when a computed upper bound for simple regret is smaller than or equal to the threshold.

18. The system of claim 13, wherein tuning the machine learning algorithm using the hyperparameter value for the at least one hyperparameter of the machine learning algorithm to generate a machine learning model comprises executing a plurality of training jobs using a training dataset to determine a machine learning model to store.

19. The system of claim 16, wherein the request to perform HPO for at least one hyperparameter of a machine learning algorithm further comprises an indication of resource limits to apply during HPO.

20. The system of claim 18, wherein the machine learning model to store is a model that performs best as measured by a defined objective metric.

* * * * *